(12) United States Patent
Choi

(10) Patent No.: US 11,885,914 B2
(45) Date of Patent: Jan. 30, 2024

(54) LIDAR SYSTEM AND SIGNAL PROCESSING METHOD THEREOF

(71) Applicant: HYUNDAI AUTRON CO., LTD., Seoul (KR)

(72) Inventor: Jae Won Choi, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 739 days.

(21) Appl. No.: 16/923,880

(22) Filed: Jul. 8, 2020

(65) Prior Publication Data

US 2021/0025988 A1 Jan. 28, 2021

(30) Foreign Application Priority Data

Jul. 24, 2019 (KR) .................. 10-2019-0089450

(51) Int. Cl.
  *G01S 7/4861* (2020.01)
  *G01S 7/4865* (2020.01)
  *G01S 17/10* (2020.01)
  *G01S 17/931* (2020.01)

(52) U.S. Cl.
  CPC .......... *G01S 7/4861* (2013.01); *G01S 7/4865* (2013.01); *G01S 17/10* (2013.01); *G01S 17/931* (2020.01)

(58) Field of Classification Search
  None
  See application file for complete search history.

(56) References Cited

U.S. PATENT DOCUMENTS

| | | | |
|---|---|---|---|
| 6,137,566 A | 10/2000 | Leonard et al. | |
| 6,493,653 B1 * | 12/2002 | Drinkard | G01R 31/2882 327/261 |
| 2018/0306908 A1 | 10/2018 | Meng et al. | |

FOREIGN PATENT DOCUMENTS

| | | |
|---|---|---|
| CN | 103401557 A | 11/2013 |
| CN | 105656456 A | 6/2016 |
| CN | 107579351 A | 1/2018 |
| CN | 107968658 A | 4/2018 |
| CN | 109581333 A | 4/2019 |
| CN | 109597057 A | 4/2019 |
| CN | 109814092 A | 5/2019 |
| CN | 109981107 A | 7/2019 |
| EP | 1882959 A1 | 1/2008 |
| JP | 2018528437 A | 9/2018 |
| KR | 20130048995 | 5/2013 |
| KR | 20180130381 | 12/2018 |

(Continued)

OTHER PUBLICATIONS

Korean Office Action for Korean Application No. 10-2019-0089450 dated Oct. 26, 2020 (4 pgs).

(Continued)

*Primary Examiner* — Luke D Ratcliffe
(74) *Attorney, Agent, or Firm* — MORGAN, LEWIS & BOCKIUS LLP (57) ABSTRACT

A light detection and ranging (LIDAR) system includes a transmitter configured to output a number of output pulses to a target object; a receiver configured to receive a plurality of input pulses corresponding to the number of output pulses; and a signal processor including a signal converter configured to convert the plurality of input pulses into discrete signals and an encoder configured to encode amplitude information of the plurality of input pulses converted into the discrete signals.

13 Claims, 7 Drawing Sheets

(56) References Cited

FOREIGN PATENT DOCUMENTS

| | | |
|---|---|---|
| KR | 20190030027 | 3/2019 |
| KR | 20190048135 A | 5/2019 |
| WO | 2009/156580 A1 | 12/2009 |

OTHER PUBLICATIONS

Office Action dated Jun. 29, 2023 for corresponding Chinese Patent Application No. 202010718518.4 (See English Translation).

* cited by examiner

LIDAR SYSTEM AND SIGNAL PROCESSING METHOD THEREOF

CROSS-REFERENCE TO RELATED APPLICATION

The present application claims priority to and the benefit of Korean Patent Application No. 10-2019-0089450 filed Jul. 24, 2019, the entire contents of which are incorporated herein by reference.

TECHNICAL FIELD

The present disclosure relates to a LIDAR system and a signal processing method thereof, and particularly, to a LIDAR system used in a vehicle and a signal processing method thereof as an example.

BACKGROUND

The statements in this section merely provide background information related to the present disclosure and may not constitute prior art.

In general, light detecting and ranging (LIDAR) is developed to a form in which geographical data for constructing 3D geographic information system (GIS) information is constructed and visualized. In recent years, the LIDAR has been applied to fields including construction, a national defense, and the like and in recent years, the LIDAR has been applied to autonomous vehicles and mobile robots.

As one example, the LIDAR system in the related art is used for a range measurement sensor in the case of an autonomous vehicle. The LIDAR system in the related art is a measurement sensor of a time of flight (ToF) acquisition scheme, which measures a distance by using a delay time between a laser signal emitted from a laser diode (LD) and a laser signal which is reflected on a target object and returned to a photo diode (PD).

Meanwhile, when the laser signal is reflected on an object, since reflectance varies depending on characteristics of the object, measuring intensity data of the laser signal input into the photo diode is being studied. In the related art, as a method for acquiring amplitude information of the input laser signal, using a high-speed analog to digital converter (ADC) is known. However, when the high-speed ADC is used, there is a problem in that a complex circuit for processing a high-speed signal is required. Further, even when a clock based circuit is used, there is a disadvantage in that a high-speed and high-stability clock source and a PLL circuit are required.

SUMMARY

The present disclosure provides a LIDAR system and a signal processing method thereof, which are capable of acquiring amplitude information by processing a signal reflected on a target object and input by using a comparator circuit and an encoding algorithm without using an analog to digital converter (ADC).

An exemplary embodiment of the present disclosure provides a LIDAR system including: a transmission unit outputting n output pulses to a target object; a reception unit receiving a plurality of input pulses corresponding to the n output pulses reflected by the target object; and a signal processing unit including a signal conversion unit converting the plurality of input pulses into discrete signals and an encoding unit encoding amplitude information of the plurality of input pulses converted into the discrete signals.

The signal conversion unit may include m (however, m is an integer equal to or larger than 2) comparators into which the plurality of input pulses is input.

Variable reference voltages having different voltage values may be applied to the m comparators, respectively and each of the m comparators may convert the plurality of input pulses of a continuous signal form into discrete signal forms by using the variable reference voltages.

The variable reference voltages may include a first variable reference voltage, a second variable reference voltage, and an m-th variable reference voltage to be applied to the m comparators, respectively, and the second variable reference voltage may have a larger voltage value than the first variable reference voltage, and the m-th variable reference voltage may have a larger voltage value than the second variable reference voltage.

The encoding unit may include an inversion logic gate unit inverting and transferring a current data value when a rising edge occurs at output terminals of comparators except for a first comparator among the m comparators, a register unit storing at least one high-level data value and receiving and storing a data value of the inversion logic gate unit when a falling edge occurs on the output terminal of the first comparator, and a logic gate unit generating an amplitude encoding value corresponding to amplitude information of the input pulse by using the data value stored in the register unit.

The inversion logic gate unit may include m−1 inverting D flip-flops of which clock input terminals are connected to output terminals of the respective comparators except for the first comparator, and a NOT gate connected between a data input terminal and a data output terminal of each of the m−1 inverting D flip-flops.

The register unit may be constituted by m×n D flip-flops (however, n is an integer equal to or larger than 2).

The logic gate unit may include a first XOR gate in which a first input terminal is connected to the output terminal of an mn-th D flip-flop among the m×n D flip-flops and a second input terminal is connected to the output terminal of an m(n−1)-th D flip-flop, and a second XOR gate in which the first input terminal is connected to the output terminal of the m(n−1)-th D flip-flop among the m×n D flip-flops and the second input terminal is connected to the output terminal of an m(n−2)-th D flip-flop.

The register unit may be an n-bit register.

Another exemplary embodiment of the present disclosure provides a signal processing method of a LIDAR system, including: an output step of outputting n output pulses to a target object; an input step of receiving a plurality of input pulses corresponding to the n output pulses reflected by the target object; a conversion step of converting the plurality of input pulses of a continuous signal form into discrete signal forms; and an encoding step of encoding amplitude information of the plurality of input pulses converted into the discrete signal forms.

In the conversion step, the plurality of input pulses may be converted into the discrete signal forms by m comparators (however, m is an integer equal to or larger than 2) to which variable reference voltages having different voltage values are applied.

The encoding step may include a first comparison step of comparing a voltage of each of the plurality of input pulses and a first variable reference voltage, a second comparison step of comparing the voltage of each of the plurality of input pulses and a second variable reference voltage when a falling edge does not occur in the first comparison step, and an inversion step of inverting a current data value and transferring the inverted data value to a register unit when a rising edge occurs in the second comparison step.

The signal processing method may further include a derivation step of deriving amplitude encoding values of the plurality of input pulses by applying the data value stored in the register unit to a predetermined logic equation when the falling edge occurs in the first comparison step.

The logic equation may include an XOR logic gate.

The second comparison step and the inversion step may be added or reduced according to the number of comparators comparing the voltage of each of the plurality of input pulses and the variable reference voltage.

According to an exemplary embodiment of the present disclosure, by a LIDAR system and a signal processing method thereof, amplitude information of a pulse signal reflected on a target object is acquired by using a comparator circuit using a variable reference voltage and an encoding algorithm without using an analog to digital converter (ADC) or a separate clock source to measure high-speed pulse information through a low-cost and low-power circuit.

Further areas of applicability will become apparent from the decription provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary embodiments of the present disclosure will be described in detail with reference to the accompanying drawings. First, when reference numerals refer to components of each drawing, it is to be noted that although the same components are illustrated in different drawings, the same components are denoted by the same reference numerals as possible. Further, hereinafter, the preferred embodiment of the present disclosure will be described, but the technical spirit of the present disclosure is not limited thereto or restricted thereby and the embodiments can be modified and variously executed by those skilled in the art.

Hereinafter, a preferred embodiment of the present disclosure will be described in detail with reference to the accompanying drawings. First, when reference numerals refer to components of each drawing, it is to be noted that although the same components are illustrated in different drawings, the same components are denoted by the same reference numerals as possible. Further, hereinafter, the preferred embodiment of the present disclosure will be described, but the technical spirit of the present disclosure is not limited thereto or restricted thereby and the embodiments can be modified and variously executed by those skilled in the art.

Figure 1:
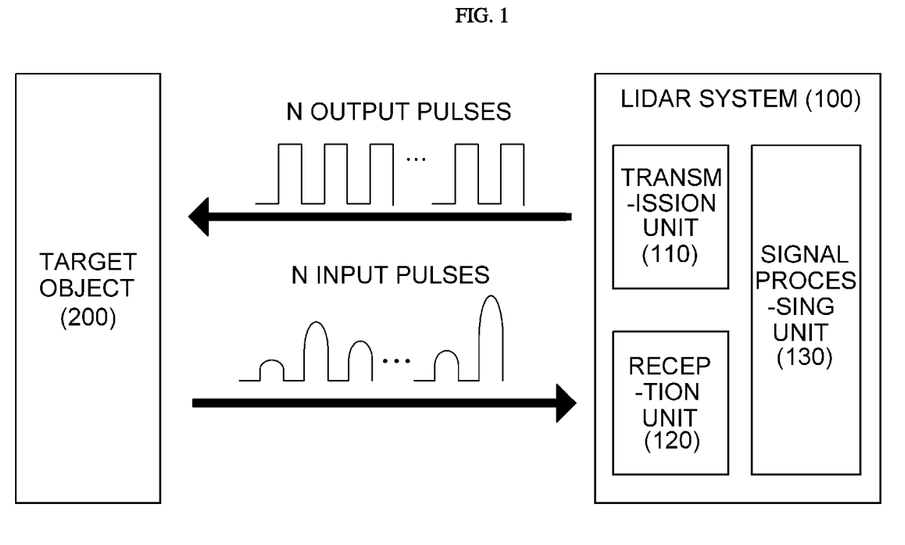
FIG. 1 is a block diagram of a LIDAR system in one form of the present disclosure.

FIG. 1 is a block diagram of a LIDAR system in some forms of the present disclosure. Referring to FIG. 1, a LIDAR system 100 in some forms of the present disclosure includes a transmission unit 110, a reception unit 120, and a signal processing unit 130.

The transmission unit 110 generates a pulse signal for sensing an object. The transmission unit 110 may be a kind of laser diode (LD). The transmission unit 110 outputs n output pulses toward a target object 200. Here, n represents a positive integer.

The reception unit 120 receives n input pulses corresponding to n output pulses reflected by the target object 200. The reception unit 120 may be a kind of photo diode (PD). Here, the number of n input pulses received by the reception unit 120 may be n or less. Hereinafter, for easy description of the disclosure, the present disclosure will be described based on input of n input pulses into the reception unit 120. The reception unit 120 converts n received input pulses into the form of an electrical signal and transfers the electrical signal. In an exemplary embodiment, the reception unit 120 may generate a voltage signal corresponding to an amplitude of each received pulse.

The signal processing unit 130 signal-processes n input pulses converted into the form of the electrical signal. The signal processing unit 130 compares n input pulses with a preset reference voltage and outputs a compared voltage level. Further, the signal processing unit 130 stores and transfers data values of n input pulses by using a previously provided register. Further, the signal processing unit 130 may generate amplitude information of n input pulses by using an encoding algorithm provided by a logic gate unit. Here, the amplitude information of n input pulses may be represented by an amplitude encoding value.

Meanwhile, the LIDAR system 100 in some forms of the present disclosure includes a time to digital converter (TDC) to perform ToF measurement of n input pulses. Further, the LIDAR system 100 may determine and classify features (e.g., transmittance and reflectivity) of the target object 200 by integrating ToF information and amplitude information of the target object.

Hereinafter, a configuration of the signal processing unit 130 of the LIDAR system 100 in some forms of the present disclosure will be described in detail.

Figure 2:
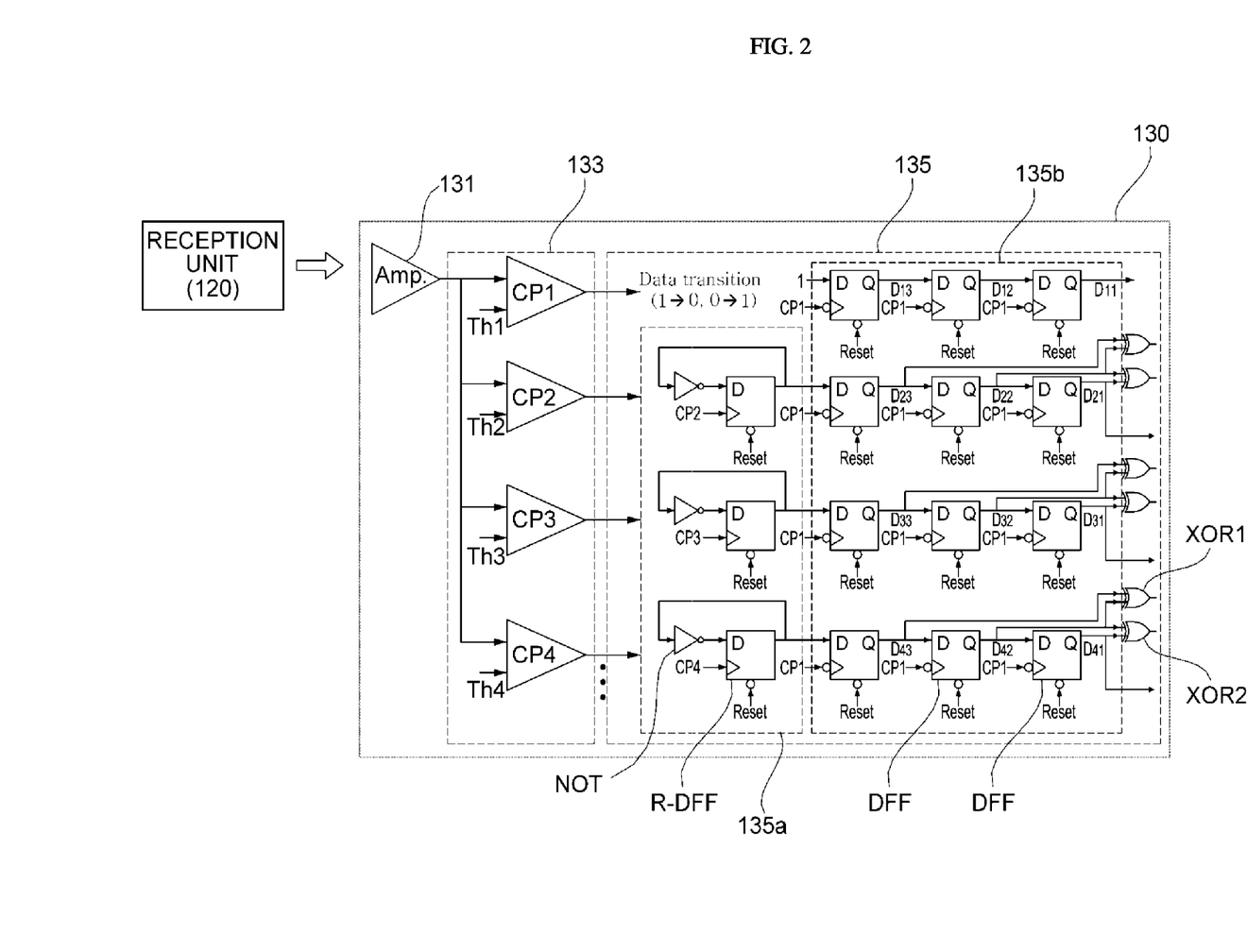
FIG. 2 is a logical circuit diagram of a signal processing unit of a LIDAR system in one form of the present disclosure.

FIG. 2 is a logic circuit diagram for describing a configuration of the signal processing unit 130 of the LIDAR system 100 in some forms of the present disclosure.

Referring to FIG. 2, the signal processing unit 130 includes an amplification unit 131, a signal conversion unit 133, and an encoding unit 135.

When the amplification unit 131 receives n input pulses from the reception unit 120, the amplification unit 131 may appropriately amplify and transfer voltage levels of n input pulses.

When the signal conversion unit 133 receives n input pulses from the amplification unit 131, the signal conversion unit 133 may convert n input pulses in a continuous signal form into discrete signal forms. The signal conversion unit 133 may be configured to include m comparators. Here, m may be a positive integer and may be appropriately set as necessary. Hereinafter, for easy description of the disclosure, the present disclosure will be described based on a configuration in which the signal conversion unit 133 is constituted by four comparators.

Each of four comparators CP1, CP2, CP3, and CP4 may convert n input pulses into the discrete signal forms by using a variable reference voltage. Here, a first reference voltage Th1 may be applied to a first comparator CP1, a second reference voltage Th2 may be applied to a second comparator CP2, a third reference voltage Th3 may be applied to a third comparator CP3, and a fourth reference voltage Th4 may be applied to a fourth comparator CP4. The variable reference voltages Th1, Th2, Th3, and Th4 may have different voltage values.

In an exemplary embodiment, the first reference voltage Th1 may have a smaller value than the second reference voltage Th2. The second reference voltage Th2 may have a larger value than the first reference voltage Th1 and a smaller value than the third reference voltage Th3. The third reference voltage Th3 may have a larger value than the second reference voltage Th2 and a smaller value than the fourth reference voltage Th4.

A result value (the amplitude information of n input pulses) of the encoding unit 135 is determined according to a rising edge or a falling edge which occurs from output terminals of four comparators CP1, CP2, CP3, and CP4.

The encoding unit 135 generates amplitude encoding values of n input pulses converted into discrete signals by the signal conversion unit 133. The encoding unit 135 is configured by a combination of an inversion logic gate unit 135a that inverts and transfers the data value according to the rising edge or falling edge which occurs from the output terminals of m−1 comparators except for the first comparator CP1 among four comparators CP1, CP2, CP3, and CP4, a register unit 135b storing the data values of n input pulses, and logic gate units XOR1 and XOR2 that generate an amplitude encoding value corresponding to the amplitude information of n input pulses by using the data value stored in the register unit 135b.

The inversion logic gate unit 135a may include m−1 inverting D flip-flop (R-DFF) in which the output terminals of three comparators CP2, CP3, and CP4 except for the first comparator CP1 are connected to a clock input terminal and a NOT gate (NOT) connected between a data input terminal and a data output terminal of each of the inverting D flip-flops (R-DFF). Here, the inverting D flip-flop (R-DFF) may have two input terminals including the data input terminal and the clock input terminal, and one output terminal. The inverting D flip-flop (R-DFF) transfers the data value input into the data input terminal through the output terminal.

The inverting D flip-flop (R-DFF) inverts and outputs a data value of '0' or '1' when the rising edge occurs at the output terminals of three comparators CP2, CP3, and CP4. In the inverting D flip-flop (R-DFF), an initial data value is set to '0'.

The register unit 135b may include a plurality of D flip-flops (DFF). The plurality of D flip-flops (DFF) may be configured to include a D flip-flop (DFF) storing a data value of a high-level '1' when the falling edge occurs from the output terminal of the first comparator CP1 among four comparators CP1, CP2, CP3, and CP4, and a plurality of D flip-flops (DFF) receiving and storing the data value from the inversion logic gate unit 135a. In the plurality of D flip-flops (DFF), the initial data value is set to '0'. The plurality of D flip-flops (DFF) may be constituted by m×n matrices. Hereinafter, the matrix will be described based on row following an order from top to bottom and columns following an order from right to left.

In an exemplary embodiment, the data input terminal of the D flip-flop (DFF) in a first column is connected to the output terminal of the D flip-flop (DFF) in a second column. The data input terminal of the D flip-flop (DFF) in the second column is connected to the output terminal of the D flip-flop (DFF) in a third column. The data input terminal of the D flip-flop (DFF) in an n-th column is connected to the output terminal of the inverting D flip-flop (R-DFF). Here, it is apparent that each of the plurality of D flip-flops (DFF) is connected to the D flip-flop (DFF) in the same row. Meanwhile, the high-level data value '1' is continuously input into the D flip-flops (DFF) in the first row and the n-th column according to a falling pulse of the first comparator CP1.

Further, the logic gate unit is connected to the output terminal of the D flip-flop (DFF) except for the D flip-flop (DFF) in the first row.

The logic gate unit may be configured to include XOR logic gates XOR1 and XOR2. The XOR logic gate is a gate that outputs true as a result when one of two inputs is true and the other is false. The XOR logic gate may include a first XOR logic gate XOR1 and a second XOR logic gate XOR2.

In the first XOR logic gate XOR1, a first input terminal is connected to the output terminal of the D flip-flop (DFF) in the n-th column and a second input terminal is connected to the output terminal of the D flip-flop (DFF) in an n−1-th column.

In the second XOR logic gate XOR2, the first input terminal is connected to the output terminal of the D flip-flop (DFF) in the n−1-th column and the second input terminal is connected to the output terminal of the D flip-flop (DFF) in an n−2-th column.

Result values of the XOR logic gates XOR1 and XOR2 are used for deriving the amplitude information of the input pulse.

Figure 3:
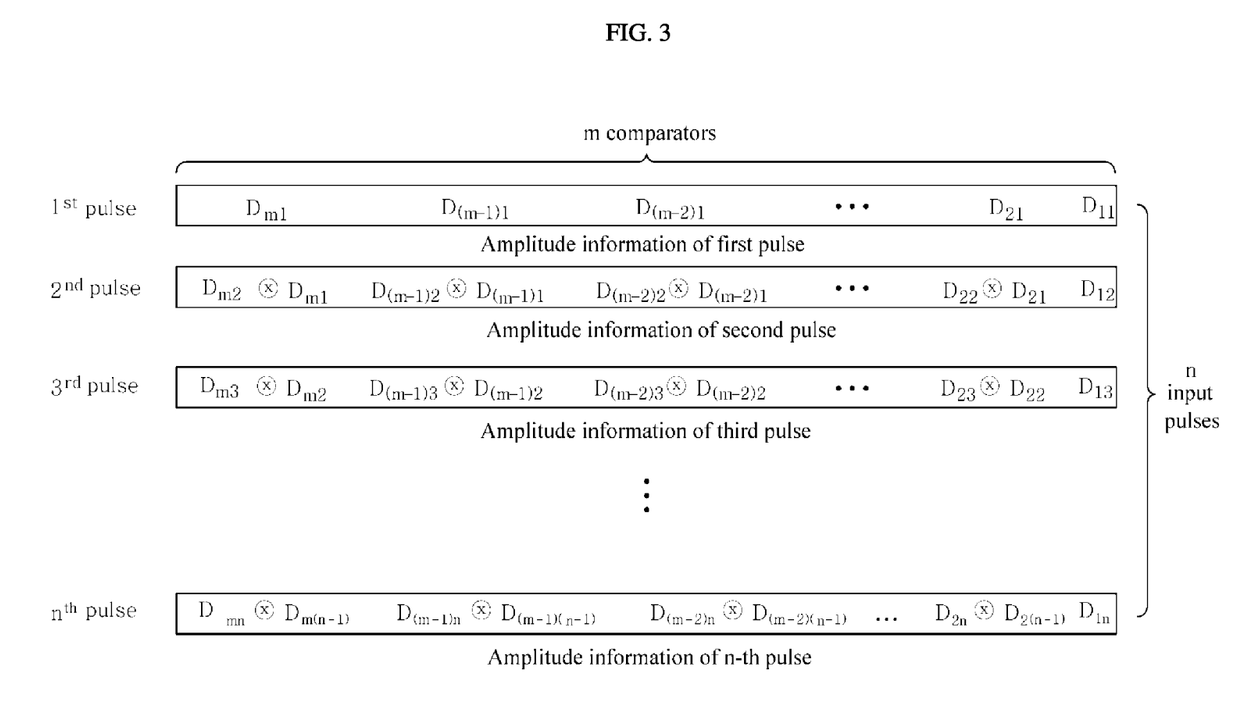
FIG. 3 is a diagram illustrating a logical equation for deriving amplitude information of a target object measured in a LIDAR system in one form of the present disclosure.

FIG. 3 is a diagram illustrating a logical equation for calculating amplitude information of a target object measured in a LIDAR system in some forms of the present disclosure.

Referring to FIGS. 2 and 3, a logic equation for calculating an amplitude encoding value indicating amplitude information of n input pulses will be described.

First, amplitude information of a first pulse ($1^{st}$ pulse) among n input pulses is calculated through data values of the register unit 135b, which are input in the order of D11, D21, D(m−2)1, D(m−1)1, and Dm1. In an exemplary embodiment, when the number of comparators is 4, the amplitude information of the first pulse ($1^{st}$ pulse) is calculated through data values input in the order of D11, D21, D31, and D41.

Figure 5:
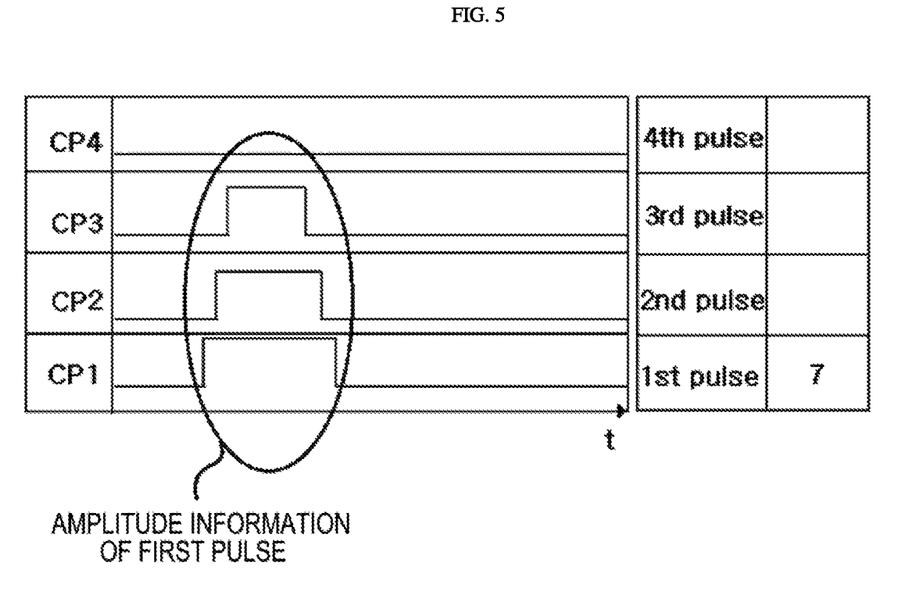
FIG. 5 is a first diagram illustrating amplitude information of a target object measured in a LIDAR system in one form of the present disclosure.

In FIG. 5, as one example for the first pulse ($1^{st}$ pulse), a pulse signal corresponding to the amplitude information of the first pulse (1st pulse) and hexadecimal value 7 may be confirmed. Here, hexadecimal value 7 of the first pulse (1st pulse) is a result shown through an amplitude encoding value '0111'. In other words, the data value D11 of the first pulse (1st pulse) is '1', D21 is '1', D31 is '1', and D41 is '0'.

Referring back to FIGS. 2 and 3, amplitude information of a second pulse (2nd pulse) among n input pulses is calculated through data values of the register unit 135b, which are input in the order of D12, D22⊗D21, D(m−2)2⊗D(m−2)1, D(m−1)2⊗D(m−1)1, and Dm2⊗Dm1.

In an exemplary embodiment, when the number of comparators is 4, the amplitude information of the second pulse (2nd pulse) is calculated through data values input in the order of D12, D22⊗D21, D32⊗D31, and D42⊗D41.

Figure 6:
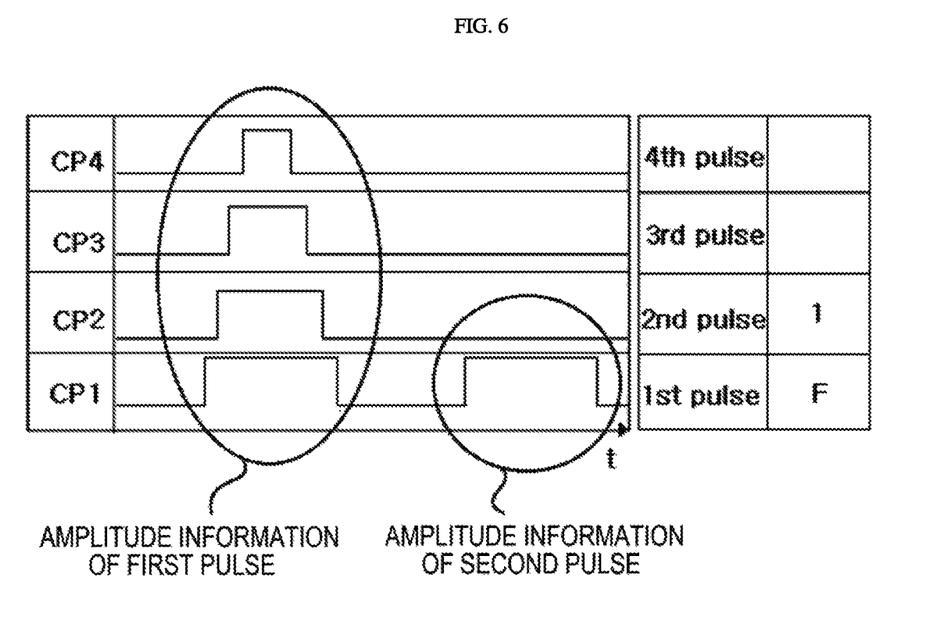
FIG. 6 is a second diagram illustrating amplitude information of a target object measured in a LIDAR system in one form of the present disclosure.

FIG. 6 illustrates pulse signals and hexadecimal values corresponding to the amplitude information of the first pulse (1st pulse) and the amplitude information of the second pulse (2nd pulse) as one example for two input pulses having different amplitudes. Here, hexadecimal value F of the first pulse (1st pulse) is a result shown through an amplitude encoding value '1111'. In other words, the data value D11 of the first pulse (1st pulse) is '1', D21 is '1', D31 is '1', and D41 is '1'.

Hexadecimal value 1 of the second pulse (2nd pulse) is a result shown through an amplitude encoding value '0001'. In other words, the data value D12 of the second pulse (2nd pulse) is '1', D22⊗D21 is '0', D32⊗D31 is '0', and D42⊗D41 is '0'.

Referring back to FIGS. 2 and 3, amplitude information of a third pulse (3rd pulse) among n input pulses is calculated through data values of the register unit 135b, which are input in the order of D13, D23⊗D22, D(m−2)3⊗D(m−2)2, D(m−1)3⊗D(m−1)2, and Dm3⊗Dm2.

In an exemplary embodiment, when the number of comparators is 4, the amplitude information of the third pulse (3rd pulse) is calculated through data values of the register unit 135b, which are input in the order of D13, D23⊗D22, D33⊗D32, and D43⊗D42.

Figure 7:
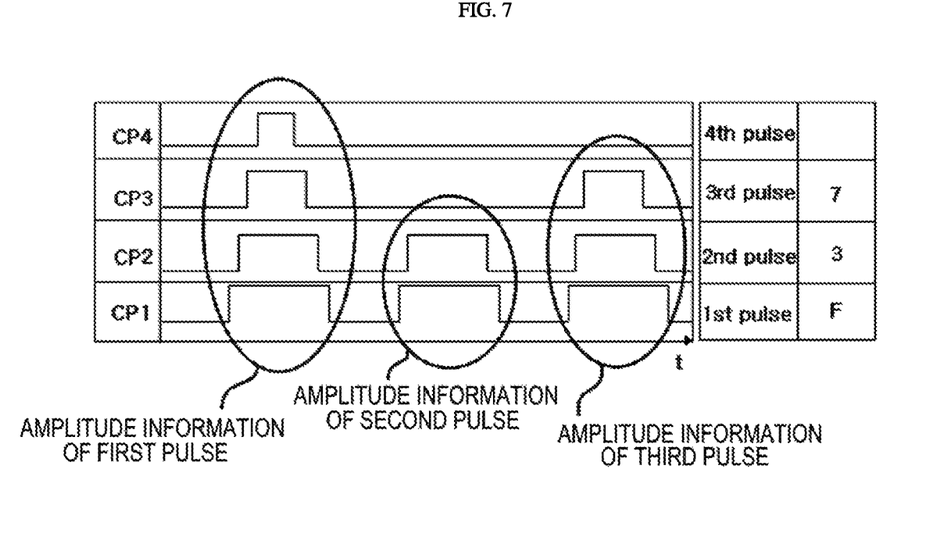
FIG. 7 is a third diagram illustrating amplitude information of a target object measured in a LIDAR system in one form of the present disclosure.

FIG. 7 illustrates pulse signals and hexadecimal values corresponding to amplitude information of three pulses as one example for three input pulses having different amplitudes. Here, hexadecimal value F of the first pulse (1st pulse) is a result shown through an amplitude encoding value '1111'. In other words, the data value D11 of the first pulse (1st pulse) is '1', D21 is '1', D31 is '1', and D41 is '1'.

Hexadecimal value 3 of the second pulse (2nd pulse) is a result shown through an amplitude encoding value '0011'. In other words, the data value D12 of the second pulse (2nd pulse) is '1', D22⊗D21 is '1', D32⊗D31 is '0', and D42⊗D41 is '0'.

Hexadecimal value 7 of the third pulse (3rd pulse) is a result shown through an amplitude encoding value '0111'. In other words, the data value D13 of the third pulse (3rd pulse) is '1', D23⊗D22 is '1', D33⊗D32 is '1', and D43⊗D42 is '0'.

Referring back to FIGS. 2 and 3, amplitude information of an n-th pulse (nth pulse) among n input pulses is calculated through data values of the register unit 135b, which are input in the order of D1n, D2n⊗D2(n−1), D(m−2)n⊗D(m−2)(n−1), D(m−1)n⊗ D(m−1)(n−1), and Dmn⊗Dm(n−1).

Hereinafter, a signal processing method of a LIDAR system in some forms of the present disclosure will be described stepwise.

Figure 4:
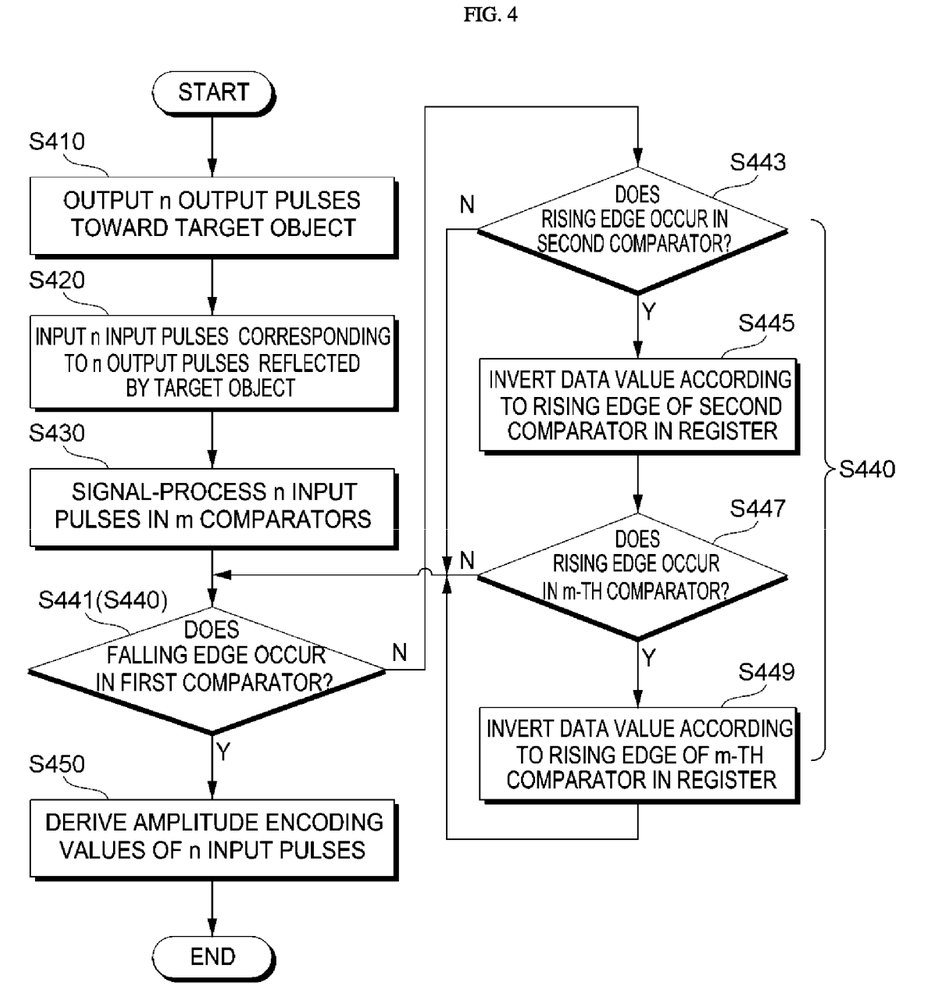
FIG. 4 is a flowchart of a signal processing method of a LIDAR system in one form of the present disclosure.

FIG. 4 is a flowchart of a signal processing method using a LIDAR system in some forms of the present disclosure.

Referring to FIGS. 1, 2, and 4, the signal processing method of the LIDAR system in some forms of the present disclosure includes an output step (S410), an input step (S420), a signal processing step (S430), an encoding step (S440), and a deriving step (S450).

First, in the output step (S410), a transmission unit 110 outputs n output pulses toward a target object 200. Here, the transmission unit 110 may be a kind of laser diode.

Then, in the input step (S420), a reception unit 120 receives n input pulses corresponding to n output pulses reflected by a target object 200. Here, the reception unit 120 may be a kind of photo diode.

Then, in the signal processing step (S430), a signal processing unit 130 performs signal processing of converting n input pulses of a continuous signal form into discrete signals by using m comparators. Here, variable reference voltages having different voltage values may be applied to m comparators, respectively.

Then, in the encoding step (S440), the signal processing unit 130 generates amplitude encoding values related to amplitude information of n input pulses based on clock pulses of m comparators. Here, the encoding step (S440) may include a first comparison step (S441), a second comparison step (S443), a first inversion step (S445), a third comparison step (S447), and a second inversion step (S449).

In the first comparison step (S441), a first comparator CP1 compares a voltage of an input pulse and a first reference voltage Th1. The first comparator CP1 determines that a rising edge occurs when the voltage of the input pulse is equal to or higher than the first reference voltage Th1 and determines that a falling edge occurs when the voltage of the input pulse is lower than the first reference voltage Th1.

In the second comparison step (S443), a second comparator CP2 compares the voltage of the input pulse and a second reference voltage Th2 when the rising edge occurs and then the falling edge does not occur in the first comparator CP1. The second comparator CP2 determines that the rising edge occurs when the voltage of the input pulse is equal to or higher than the second reference voltage Th2 and determines that the falling edge occurs when the voltage of the input pulse is lower than the second reference voltage Th2.

In the first inversion step (S445), the inversion logic gate unit 135a inverts a current data value from '0' to '1' or from '1' to '0' and transfers the inverted data value according to the rising edge of the second comparator CP2 when the rising edge occurs in the second comparator CP2.

In the third comparison step (S447), an m-th comparator compares a voltage of an input pulse and an m-th reference voltage. Here, the m-th comparator may be the third comparator CP3 based on three comparators and the fourth comparator CP4 based on four comparators. Further, the m-th reference voltage may be the third reference voltage Th3 based on three comparators and the fourth reference voltage Th4 based on four comparators. In other words, in the third comparison step (S447), as the number of comparators increases, the step may be further subdivided.

In an exemplary embodiment, when the number of comparators is 3, the third comparator CP3 determines that the rising edge occurs when the voltage of the input pulse is equal to or higher than the third reference voltage Th3 and determines that the falling edge occurs when the voltage of the input pulse is lower than the third reference voltage Th3.

In another exemplary embodiment, when the number of comparators is 4, the fourth comparator CP4 determines that the rising edge occurs when the voltage of the input pulse is equal to or higher than the fourth reference voltage Th4 and determines that the falling edge occurs when the voltage of the input pulse is lower than the fourth reference voltage Th4.

In the second inversion step (S449), the inversion logic gate unit 135a inverts the current data value from '0' to '1' or from '1' to '0' and transfers the inverted data value according to the rising edge of the third comparator CP3 when the rising edge occurs in the third comparator CP3. Further, the inversion logic gate unit 135a inverts the current data value from '0' to '1' or from '1' to '0' and transfers the inverted data value according to the rising edge of the fourth comparator CP4 when the rising edge occurs in the fourth comparator CP4.

Last, in the derivation step (S450), the signal processing unit 130 derives the amplitude encoding values of n input pulses by applying the data value stored in the register unit 135b to a predetermined logic equation (see FIG. 3) when the falling edge occurs in the clock pulse of the first comparator CP1. Here, the logic equation is provided through the logic gate units XOR1 and XOR2 including a plurality of XOR logic gates.

Meanwhile, the embodiments in some forms of the present disclosure may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A light detection and ranging (LIDAR) system comprising:
   a transmitter configured to output a number of output pulses to a target object;
   a receiver configured to receive a plurality of input pulses corresponding to the number of output pulses; and
   a signal processor including a signal converter and an encoder,
   wherein the signal converter is configured to convert the plurality of input pulses into discrete signals and comprises a plurality of comparators into which the plurality of input pulses is input, and
   the encoder is configured to encode amplitude information of the plurality of input pulses converted into the discrete signals, and comprises:
      an inversion logic gate configured to invert and transfer a current data value when a rising edge occurs at output terminals of comparators except for a first comparator of the plurality of comparators;
      a register configured to receive and store a data value of the inversion logic gate; and
      a logic gate configured to generate an amplitude encoding value corresponding to amplitude information of the input pulse, and comprising:
         a first XOR gate having a first input terminal connected to a first output terminal of the register and a second input terminal connected to a second output terminal of the register; and
         a second XOR gate having a first input terminal connected to the second output terminal of the register and a second input terminal connected to a third output terminal of the register.

2. The LIDAR system of claim 1, wherein the plurality of comparators is configured to:
   apply variable reference voltages having different voltage values, respectively; and
   convert the plurality of input pulses of a continuous signal form into discrete signal forms by using the variable reference voltages.

3. The LIDAR system of claim 2, wherein the variable reference voltages include a first variable reference voltage, a second variable reference voltage, and an m-th variable reference voltage to be applied to the plurality of comparators, respectively, and
   the second variable reference voltage has a greater voltage value than the first variable reference voltage, and
   the m-th variable reference voltage has a greater voltage value than the second variable reference voltage.

4. The LIDAR system of claim 1, wherein
   the register is configured to:
      store at least one high-level data value, and
      receive and store the data value of the inversion logic gate when a falling edge occurs on the output terminal of the first comparator, and
   the logic gate is configured to generate the amplitude encoding value corresponding to the amplitude information of the input pulse by using the stored at least one high-level data value.

5. The LIDAR system of claim 4, wherein the inversion logic gate comprises:
   m−1 inverting D flip-flops, wherein clock input terminals of the m−1 inverting D flip-flops are connected to the output terminals of the comparators except for the first comparator; and
   a NOT gate connected between a data input terminal and a data output terminal of each of the m−1 inverting D flip-flops.

6. The LIDAR system of claim 4, wherein the register is configurable by m×n D flip-flops, wherein n is an integer equal to or greater than 2.

7. The LIDAR system of claim 6, wherein
   the first output terminal of the register is an output terminal of an mn-th D flip-flop of the m×n D flip-flops,
   the second terminal of the register is an output terminal of an m(n−1)-th D flip-flop of the m×n D flip-flops, and the third output terminal of the register is an output terminal of an m(n−2)-th D flip-flop of the m×n D flip-flops.

8. The LIDAR system of claim 4, wherein the register is an n-bit register.

9. A signal processing method of a light detection and ranging (LIDAR) system, comprising:
- outputting a number of output pulses to a target object;
- receiving a plurality of input pulses corresponding to the number of output pulses;
- converting the plurality of input pulses of a continuous signal form into discrete signal forms; and
- encoding amplitude information of the plurality of input pulses converted into the discrete signal forms,
- wherein encoding the amplitude information comprises an inversion step of inverting a current data value and transferring the inverted data value to a register,
- the method further comprises a derivation step of deriving amplitude encoding values of the plurality of input pulses by applying the data value stored in the register to a predetermined logic equation, and
- the predetermined logic equation includes an XOR logic gate.

10. The signal processing method of claim 9, wherein converting the plurality of input pulses of the continuous signal form comprises:
- converting the plurality of input pulses into the discrete signal forms by a plurality of comparators to which variable reference voltages having different voltage values are applied.

11. The signal processing method of claim 10, wherein encoding the amplitude information comprises:
- a first comparison step of comparing a voltage of each of the plurality of input pulses and a first variable reference voltage; and
- a second comparison step of comparing the voltage of each of the plurality of input pulses and a second variable reference voltage when a falling edge does not occur in the first comparison step, and
- the inverted data value is transferred to the register when a rising edge occurs in the second comparison step.

12. The signal processing method of claim 11, wherein the amplitude encoding values of the plurality of input pulses are derived by applying the data value stored in the register to the predetermined logic equation when the falling edge occurs in the first comparison step.

13. A signal processing method of a light detection and ranging (LIDAR) system, comprising:
- outputting a number of output pulses to a target object;
- receiving a plurality of input pulses corresponding to the number of output pulses;
- converting the plurality of input pulses of a continuous signal form into discrete signal forms; and
- encoding amplitude information of the plurality of input pulses converted into the discrete signal forms,
- wherein converting the plurality of input pulses of the continuous signal form comprises converting the plurality of input pulses into the discrete signal forms by a plurality of comparators to which variable reference voltages having different voltage values are applied,
- the encoding the amplitude information comprises:
  - a first comparison step of comparing a voltage of each of the plurality of input pulses and a first variable reference voltage;
  - a second comparison step of comparing the voltage of each of the plurality of input pulses and a second variable reference voltage when a falling edge does not occur in the first comparison step; and
  - an inversion step of inverting a current data value and transferring the inverted data value to a register when a rising edge occurs in the second comparison step, and
- the method further comprising adding or deleting the second comparison step and the inversion step according to a number of comparators comparing the voltage of each of the plurality of input pulses and the variable reference voltage.

* * * * *